2,761,776

PROCESS FOR THE MANUFACTURE OF PARTICULATE METALLIC NIOBIUM

Foord von Bichowsky, Wilmington, Del.

No Drawing. Application March 29, 1956,
Serial No. 574,600

8 Claims. (Cl. 75—.5)

Recently, due to technological advances, a revived interest has been shown in the two sister metals niobium and tantalum. The production of the former in a particulate form by an improved process is the subject of this invention. The process, however, is not to be viewed as entirely excluding tantalum from its scope because the raw materials for the manufacture of niobium metal (formerly called columbium) usually contain tantalum in varying amounts.

The principal raw materials employed until now for the winning of niobium have been, among others, the chlorides which have been reduced by the thermit process, by misch metal or with calcium hydride and the potassium fluoxyniobates which have been subjected to electrolysis in baths of molten salts.

The reduction of niobium chlorides by hydrogen is encumbered with the problem of the disposal of the corrosive by-product hydrochloric acid and with the considerable volatility of the niobium pentachloride; while the fused salt electrolysis is handicapped with the need for removing the entrained salts from the product and by low yields.

The thermit process supplies a product contaminated with aluminum which must be removed by a tedious high temperature distillation under high vacuum while the crude cerium, which constitutes misch metal, is probably too expensive for other than laboratory use. The same objection would appear to be true of pure calcium hydride.

Another agent proposed for reducing $Nb_2O_5$ was carbon, also as a carbide, but as the temperature at which the niobium oxide is reduced is high any metal formed is quite certain to be made brittle through carbon or carbide contamination. Therefore that cheap reducing agent is not altogether applicable to the purposes of the present invention.

The employment of hydrogen alone for reducing niobium oxides, for example, niobium pentoxide, leads at temperatures as high as 1700° C. only to a sub-oxide and consequently that gaseous reductant is not suitable by itself. It has been stated, however, that in the presence of finely divided metallic nickel, hydrogen will reduce niobium oxide at readily attainable temperatures, e. g. 1150° C. to give solid niobium-nickel alloys.

In that method, as described in detail in the literature, an intimate mixture of finely divided metallic nickel was mixed with the desired amount of niobium pentoxide by grinding them together and strongly compressing the mixture into a rectangular ingot. Upon heating this for two hours in a current of dry hydrogen to 1100°–1150° C. a dense rod was obtained.

Because such a method, despite the rather low niobium content of the ingot (maximum 37%) should operate on a commercial scale without any disposal problems, applicant began a study of the method to see if any way could be found for so changing it that a product might be obtained from which the nickel content could be removed by mechanical or chemical means, or a combination thereof, so as to give a product consisting of pure niobium.

The following method is the successful outcome of that investigation. In its present form it consists of two principal steps:

1. Preparing by chemical or mechanical means a mixture of a niobium compound or compounds containing oxygen and compound or compounds of nickel containing oxygen together with a relatively small amount of an "opening-up" or sponge-forming agent such as carbon or a carbon compound completely removable by heat, then reducing the resulting spongy, somewhat firm material in a current of dry hydrogen so as to give a still porous metallic product and immediately cooling the product in a non-reactive atmosphere.

2. Subjecting that reduced material to the action of carbon monoxide at temperatures within the range of from 18° to 250° C. either at, below or above atmospheric pressure and recovering the pure niobium in a particulate form. The nickel carbonyl produced in that operation then being converted to metallic nickel or burnt with air to the oxide or to compounds containing oxygen or changed into a nickel salt or salts by known meeans.

Specimen methods for preparing the mixtures, mentioned in the first of the above steps, and their granulating or compressing will be illustrated by subsequent examples. However, it should be said that when carbon or a product depositing a carboniferous residue is used as a sponge-forming agent then the mixture should be heated in an inert gas, for example nitrogen, to perhaps not above 700° C. or until all the carbon has been used up but before any of the oxygen containing compound has been reduced to the metal (i. e. under non-metalliferous conditions) or appreciably sintered and prior to subjecting the opened-up material to reduction in hydrogen. One reason for this use of an inert gas is to avoid any later explosion with hydrogen due to entrained air.

The complete reduction of these spongy products, as cited, takes place in pure hydrogen gas the reduction being amenable to batch, semi-continuous or continuous operation. For batch working, or laboratory control, the charge is placed in an externally heated retort and hydrogen is passed over the charge until the completion of the operation, whereupon the hydrogen is at once replaced by a neutral gas such as helium or argon so as to prevent the formation of niobium hydride. When cold the spongy reduced product is ready for the second step. In semi-continuous operation use may be made, for example, of an internally heated bubbling-bed type of reactor; the almost incandescent bed being allowed to cool in the furnace or being removed by an inert gas at the end of the reduction. In continuous working the charge may be fed onto a vibrating bed, heated by radiation, along which it slowly travels until, at the completion of the reaction, it falls from the end of that level or slightly inclined bed or trough into an externally cooled chilling chamber. In this case, with the very rapid chilling, the need for an inert gas is removed.

In reduction operations of the above type the amount of water vapor in the exist gas is limited by equilibrium considerations, therefore, if it is extended to recycle the spent hydrogen it should be dried before reentering the reducing furnace. Also in such a reducing step it is advisable to maintain a positive pressure on the hydrogen in the system; first to prevent any ingress of air and second to facilitate the penetration of the pure hydrogen into the recesses of the sponge. For such purposes there usually suffices a pressure of a few centimeters of mercury above the atmospheric pressure.

The treatment of the sponge, reduced by one of the methods as described above with carbon monoxide, which reaction constitutes the second step, follows the known art in that the charge may be moved slowly through the apparatus for the carbonyling. The cold pure niobium powder then is discharged, for example, through a seal.

The results obtained by this combination of methods are new for it is known that nickel heated to above 350° C. resists the action of CO and, for example, with alloys of Cu-Ni only about 70% of the nickel content can be removed by a single treatment with carbon monoxide gas; therefore the present invention represents real and unexpected advances in the known art.

It may be in the second stage of this process that the niobium acts as a catalyst or accelerating agent and this, together with the spongy nature of the reduced product, allows the reaction to proceed to completion. However, applicant does not restrict himself to the above explanation but only to the results as stated.

Having now described the invention in general terms specific examples for carrying on the process will be given:

Example 1

1 part by weight of dry commercial grade $Nb_2O_5$
1.75 parts by weight of dry nickel sesquioxide ($Nb_2O_3$)
0.1 part by weight of lampblack
4 parts by weight of mineral thinner are placed in a steel ball mill with steel balls and ground for 1 to 3 hours (depending upon the grain size of the starting ingredients). The resultant slurry is treated with a magnet to remove any traces of iron and then is filtered as dry as possible on a suction filter and the solid filter cake is granulated by rubbing it through a 10 mesh screen. The damp granules are dried under vacuum.

A portion of this product is placed in a large nickel or refractory boat and introduced into a tube furnace and slowly heated therein by external heating to a maximum of 700° C. in a slow current of nitrogen or other suitable gas until CO—$CO_2$ no longer is given off. The boat is allowed to cool and is weighed. Then the boat and the, at most incipiently sintered, sample are reintroduced into the furnace and the nitrogen is replaced by hydrogen which has been freed of oxygen and carefully dried. The reduction is conducted at rising temperature and under a positive pressure until the desired maximum is attained. Then the charge is held at that temperature until the reduction is complete. The maximum temperature being that at which no real sintering of the mass takes place. With such a spongy material the temperature used and the duration of heating may be less than the figures of 1150° C. and of 2 hours as given in the literature. Once optima conditions have been established for a given product, through a pilot run, the main charge may be reduced under like conditions. In all cases the thus reduced product is cooled as quickly as possible, preferably in an inert gas.

Some of the incipiently sintered reduced mass or sponge next is transferred to a glass tube equipped with a sintered glass disc, to act as a retainer for any dusty niobium. The tube and contents are warmed to about 50° C. by a suitable strip heater, while CO gas is passed through the tube. The pressure in the reaction space is kept below atmospheric. The exit gas which contains nickel carbonyl may be burnt with air to give nickel oxide and carbonate for reuse in the process or else it may be condensed to liquid $Ni(CO)_4$ or otherwise treated. The residual metallic powder, when the operation has carefully followed the foregoing description, will be a high grade niobium in particulate form, readily adaptable to the requirements of powder or sinter metallurgy.

Example 2

1 part by weight of niobium pentoxide
1 part by weight of nickel sesquioxide
2.5 parts by weight of basic nickel carbonate $$[2NiCO_3 \cdot 3Ni(OH)_2 \cdot 4H_2O]$$

10 parts by weight of water
1 part by weight of glucose.

These ingredients are ground together in a porcelain ball mill with flint pebbles for 1 hour. The slurry is filtered or centrifuged and the cake dried at 125° C. The dried cake is granulated through a 16 mesh screen, a small amount of a decomposable lubricant such as stearic acid is added and the lubricated granules pressed into ⅛″ diameter briquettes. These are heated in an atmosphere of nitrogen to destroy the glucose binder and the lubricant and to drive out $CO_2$ and water vapor. The briquettes thus are made porous to hydrogen. These porous briquettes are reduced in that gas as in Example 1. The carbonyling of the reduced product also may follow the procedure as given there.

Example 3

6 parts by weight of basic nickel carbonate ground to pass a 200 mesh screen
1 part by weight of niobium pentoxide, containing less than 2% of tantalum pentoxide and ground to pass a 200 mesh screen.

These ingredients are mixed together in a kneader having sigma blades, while moistening the mix with a saturated solution of ammonium carbonate until a plastic paste is obtained. This paste next is shaped into a ribbon by means of an extruder or is ground through a meat grinder. The moist ribbon or the short cylindrical pieces from the grinder then are dried at a temperature high enough to completely decompose the ammonium carbonate. The gaseous $CO_2$, $NH_3$ and steam that escaped during the heating or drying operation leave the mixture in a porous condition ready for reduction. The subsequent steps of reduction in hydrogen and of the removal of Ni from the sponge parallel those in Example 1.

Example 4

One co-strikes, at equal rate, into a well stirred suspension of 2 grams of finely ground carbon in a liter of boiling water, which is kept boiling during the entire strike, one liter each of the following solutions at room temperature:

Normal niobium pentachloride, slightly acid ($NbCl_5$)
Twice normal nickel chloride ($NiCl_2 \cdot 6H_2O$)
Four normal ammonium hydroxide ($NH_4OH$).

The resulting coprecipitate of the hydrated oxides of nickel and niobium and any tantalum is allowed to settle, is washed several times by decantation to remove the excess of ammonium chloride and any floating unoccluded carbon. Then the hydrates are collected on a suction filter. The filter cake is dried, broken up and that roughly ground material is treated for the removal of the sponge-forming agent and in other steps as is the material in Example 1.

In the examples as given, which are descriptive and in no way limiting, and in the discussion no direct mention has been made of the possibility of employing other oxygen containing compounds of nickel or of niobium and/or tantalum such, for example, as the oxychlorides, nitrates or sulfates.

However, the use of such salts is associated with the evolution of corrosive vapors and therefore for hygienic and constructional reasons their use, as the cited compounds, is not advocated but is not excluded from the scope of this invention.

I claim:

1. Process for the manufacture of particulate metallic niobium which comprises the steps consisting in preparing an intimate mixture of at least one oxygen containing compound of nickel and of at least one oxygen containing compound of niobium together with a carboniferous sponge-forming agent; eliminating that agent by heating the mixture under nonmetalliferous conditions; reducing the resultant porous mixture with hydrogen gas for a period and at a temperature to give a spongy material consisting of metallic nickel and metallic niobium and cooling this sponge under non-reactive conditions; removing the nickel therefrom in a single operation by the employment of carbon monoxide gas and recovering the pure product.

2. Process for the manufacture of particulate metallic niobium which comprises the steps consisting in preparing an intimate mixture of nickel oxide and niobium pentoxide together with a carboniferous sponge-forming agent; eliminating that agent by heating the mixture under non-metalliferous conditions; reducing the porous mixture with hydrogen for a period and at a temperature to give a spongy material consisting of metallic nickel and metallic niobium and cooling this sponge under non-reactive conditions; removing the nickel therefrom in a single operation by the employment of carbon monoxide gas and recovering the pure product.

3. Process for the manufacture of particulate metallic niobium which comprises the steps consisting in preparing an intimate mixture of hydrated nickel hydroxide and hydrated niobic acid together with a carboniferous sponge-forming agent; eliminating that agent by heating the mixture under nonmetalliferous conditions; reducing the porous mixture with hydrogen for a period and at a temperature to give a spongy material consisting of metallic nickel and metallic niobium and cooling this sponge under non-reactive conditions; removing the nickel therefrom in a single operation by the employment of carbon monoxide gas and recovering the pure product.

4. Process for the manufacture of particulate metallic niobium which comprises the steps consisting in preparing an intimate mixture of basic nickel carbonate, nickel oxide and niobium pentoxide together with a carboniferous sponge-forming agent; eliminating that agent by heating the mixture under nonmetalliferous conditions; reducing the porous mixture with hydrogen for a period and at a temperature to give a spongy material consisting of metallic nickel and metallic niobium and cooling this sponge under non-reactive conditions; removing the nickel therefrom in a single operation by the employment of carbon monoxide gas and recovering the pure product.

5. Process for the manufacture of particulate metallic niobium which comprises the steps consisting in preparing an intimate mixture of nickel sesquioxide together with carbon as a sponge-forming agent in an amount chemically equivalent to about half of the oxygen combined with the nickel; eliminating the carbon by heating the mixture under nonmetalliferous conditions; reducing the resulting porous mixture with hydrogen for a period and at a temperature to give a spongy material consisting of metallic nickel and metallic niobium and cooling this sponge under non-reactive conditions; removing the nickel therefrom in a single operation by the employment of carbon monoxide gas and recovering the pure product.

6. Process for the manufacture of particulate metallic niobium which comprises the steps consisting in preparing an intimate mixture of basic nickel carbonate in excess and niobium pentoxide and incorporating a solution of ammonium carbonate as a carboniferous sponge-forming agent; eliminating the agent by heating the mixture; reducing the resultant porous mixture with hydrogen for a period and at a temperature to give a spongy material consisting of metallic nickel and metallic niobium and cooling this sponge under non-reactive conditions; removing the nickel therefrom in a single operation by the use of carbon monoxide gas and recovering the pure product.

7. Process for the manufacture of particulate metallic niobium which comprises the steps consisting in preparing an intimate mixture, having the proportions of 2 mols of nickel hydroxide to one mol of hydrated niobic acid together with one-sixth mol of carbon as a sponge-forming agent; eliminating the carbon by heating the mixture to a maximum of 700° C. in nitrogen; reducing the resultant porous mixture with hydrogen for a period and at a temperature to give a spongy material consisting of metallic nickel and metallic niobium and cooling this sponge in argon; removing the nickel therefrom in a single operation by the use of gaseous carbon monoxide and recovering the pure product.

8. Process for the manufacture of particulate metallic niobium which comprises the steps consisting in preparing an intimate mixture of nickel oxide and niobium pentoxide in the ratio by weight of 2 to 1 together with carbon as a sponge-forming agent in an amount chemically equivalent to about half of the oxygen combined with the nickel; eliminating the carbon by heating the mixture in a current of nitrogen for at most 2 hours at a temperature not exceeding 700° C.; reducing the resultant porous mixture with hydrogen within a range of 900° to 1200° C. for a time not exceeding four hours, to form a spongy material consisting of metallic nickel and metallic niobium and rapidly cooling this sponge in hydrogen; removing the nickel therefrom in a single operation by the use of carbon monoxide gas and recovering the pure product.

No references cited.